US012615327B2

(12) United States Patent
Tummala

(10) Patent No.: US 12,615,327 B2
(45) Date of Patent: Apr. 28, 2026

(54) DYNAMIC MODIFICATION OF COMMUNICATION OPERATIONS EXCHANGED BETWEEN INTERCONNECTED NETWORKS

(71) Applicant: Boost SubscriberCo L.L.C., Englewood, CO (US)

(72) Inventor: Suresh Tummala, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 277 days.

(21) Appl. No.: 18/403,906

(22) Filed: Jan. 4, 2024

(65) Prior Publication Data
US 2025/0227173 A1 Jul. 10, 2025

(51) Int. Cl.
| | |
|---|---|
| *H04L 12/28* | (2006.01) |
| *H04L 69/22* | (2022.01) |
| *H04M 1/663* | (2006.01) |
| *H04W 12/06* | (2021.01) |

(52) U.S. Cl.
CPC ............ *H04M 1/663* (2013.01); *H04L 69/22* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 6,222,841 B1 * | 4/2001 | Taniguchi | .............. | H04N 19/37 |
| | | | | 375/E7.091 |
| 6,879,581 B1 * | 4/2005 | Leung | ................... | H04L 65/103 |
| | | | | 370/352 |

| | | | | |
|---|---|---|---|---|
| 7,313,315 B2 * | 12/2007 | Morris | ............... | H04N 21/4305 |
| | | | | 386/334 |
| 8,509,229 B2 * | 8/2013 | Okuda | ................ | H04L 12/4633 |
| | | | | 370/395.3 |
| 9,223,765 B1 * | 12/2015 | Alakuijala | .............. | H03M 7/46 |
| 9,392,485 B1 * | 7/2016 | Vivanco | .................. | H04L 47/38 |

(Continued)

OTHER PUBLICATIONS

Suresh Tummala, Dynamic Modification of Error Mapping Operations During Communication Operations, U.S. Appl. No. 18/404,005, filed Jan. 4, 2024, pp. 1-38.

*Primary Examiner* — Tuan A Tran

(74) *Attorney, Agent, or Firm* — Baker Botts L.L.P.

(57) ABSTRACT

An apparatus comprises a memory and a processor communicatively coupled to one another. The memory may be configured to store configuration commands configured to trigger one or more encoding operations and one or more decoding operations. The processor may be configured to receive a communication request comprising communication information comprising one or more data packets, obtain identity (ID) header information from the one or more data packets, decode at least one portion of the ID header information into decoded ID header information, derive a translation value from the decoded ID header information, and modify the translation value into a modified translation value. Further, the processor is configured to encode the modified translation value into an encoded modified translation value, reconstruct the ID header information based on the encoded modified translation value, and forward the communication request comprising a reconstructed version of the ID header information to a testing system.

20 Claims, 3 Drawing Sheets

(56)  References Cited

U.S. PATENT DOCUMENTS

| | | | | |
|---|---|---|---|---|
| 9,398,043 | B1 * | 7/2016 | Yang | H04L 63/1441 |
| 9,402,209 | B1 * | 7/2016 | Vivanco | H04L 1/0076 |
| 9,515,925 | B2 * | 12/2016 | Wentink | H04W 8/26 |
| 9,973,781 | B2 * | 5/2018 | Schierl | H04N 19/67 |
| 10,178,582 | B2 * | 1/2019 | Asterjadhi | H04L 1/1896 |
| 10,681,368 | B2 * | 6/2020 | Takiue | H04N 19/70 |
| 10,694,423 | B2 * | 6/2020 | Agneray | H04L 1/0006 |
| 10,764,783 | B2 * | 9/2020 | Agneray | H04L 47/34 |
| 11,089,334 | B1 * | 8/2021 | Bhattacharyya | H04N 19/188 |
| 11,101,925 | B2 * | 8/2021 | Langhammer | H04L 1/0061 |
| 12,244,419 | B2 * | 3/2025 | Le Bars | H04L 1/06 |

* cited by examiner

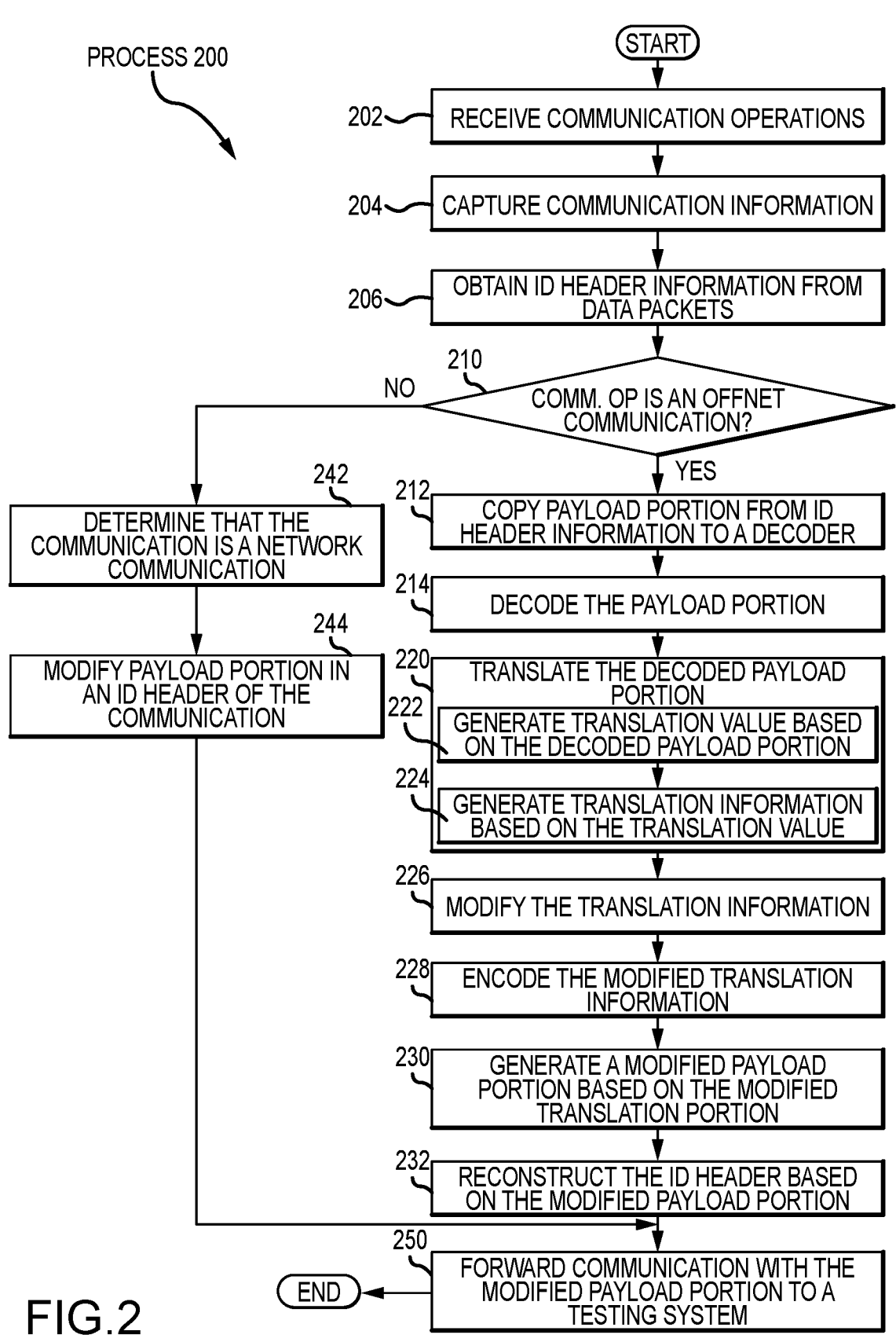

PROCESS 200

START

202 — RECEIVE COMMUNICATION OPERATIONS

204 — CAPTURE COMMUNICATION INFORMATION

206 — OBTAIN ID HEADER INFORMATION FROM DATA PACKETS

210 — COMM. OP IS AN OFFNET COMMUNICATION?

NO

YES

242 — DETERMINE THAT THE COMMUNICATION IS A NETWORK COMMUNICATION

212 — COPY PAYLOAD PORTION FROM ID HEADER INFORMATION TO A DECODER

214 — DECODE THE PAYLOAD PORTION

244 — MODIFY PAYLOAD PORTION IN AN ID HEADER OF THE COMMUNICATION

220 — TRANSLATE THE DECODED PAYLOAD PORTION

222 — GENERATE TRANSLATION VALUE BASED ON THE DECODED PAYLOAD PORTION

224 — GENERATE TRANSLATION INFORMATION BASED ON THE TRANSLATION VALUE

226 — MODIFY THE TRANSLATION INFORMATION

228 — ENCODE THE MODIFIED TRANSLATION INFORMATION

230 — GENERATE A MODIFIED PAYLOAD PORTION BASED ON THE MODIFIED TRANSLATION PORTION

232 — RECONSTRUCT THE ID HEADER BASED ON THE MODIFIED PAYLOAD PORTION

250 — FORWARD COMMUNICATION WITH THE MODIFIED PAYLOAD PORTION TO A TESTING SYSTEM

END

FIG.2

PROCESS 300

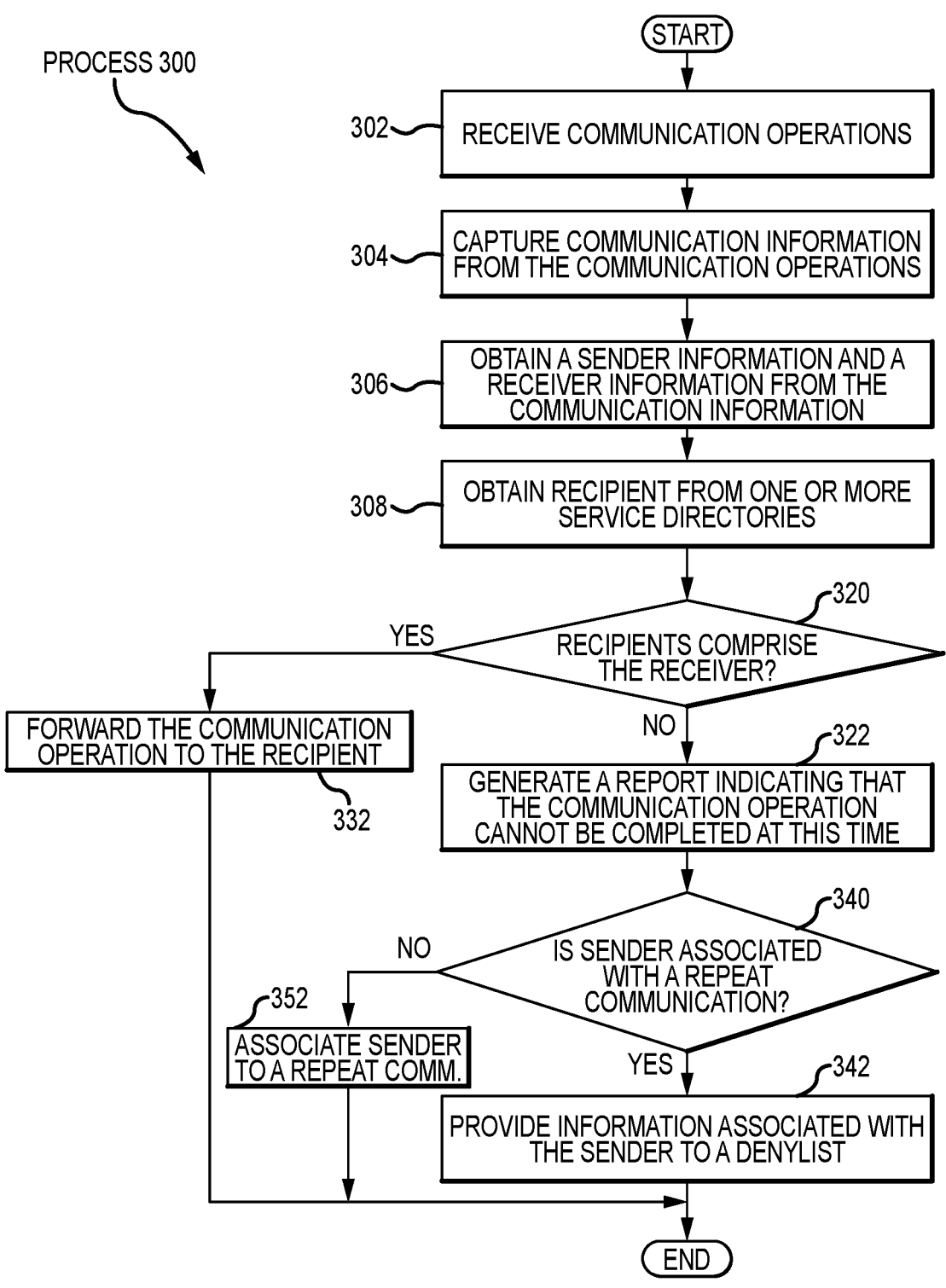

START

302 — RECEIVE COMMUNICATION OPERATIONS

304 — CAPTURE COMMUNICATION INFORMATION FROM THE COMMUNICATION OPERATIONS

306 — OBTAIN A SENDER INFORMATION AND A RECEIVER INFORMATION FROM THE COMMUNICATION INFORMATION

308 — OBTAIN RECIPIENT FROM ONE OR MORE SERVICE DIRECTORIES

320 — RECIPIENTS COMPRISE THE RECEIVER?

YES

FORWARD THE COMMUNICATION OPERATION TO THE RECIPIENT
332

NO

322 — GENERATE A REPORT INDICATING THAT THE COMMUNICATION OPERATION CANNOT BE COMPLETED AT THIS TIME

340 — IS SENDER ASSOCIATED WITH A REPEAT COMMUNICATION?

NO

352 — ASSOCIATE SENDER TO A REPEAT COMM.

YES

342 — PROVIDE INFORMATION ASSOCIATED WITH THE SENDER TO A DENYLIST

END

FIG.3

DYNAMIC MODIFICATION OF COMMUNICATION OPERATIONS EXCHANGED BETWEEN INTERCONNECTED NETWORKS

TECHNICAL FIELD

The present disclosure relates generally to modifying communication operations, and more specifically to dynamically modifying communication operations exchanged between one or more interconnected networks.

BACKGROUND

In a telephony network, users may be configured to receive and/or transmit calls to user devices located outside of the telephony network. For example, a call may originate at a user device outside of the telephony network to be received by a user in the telephony network. These calls may be considered as a communication between two or more interconnected networks. In some interconnected networks, malicious users may generate calls to the telephony network using auto-initiated communication requests (e.g., robocalls, spam calls, and the like). These malicious users may use auto-initiated communication requests capable of performing multiple simultaneous calls with the intention of performing phishing and/or scamming operations after engaging a user in the telephony network. In this regard, calls generated by auto-initiated communication requests increase traffic in the telephony network while attempting to steal information and/or resources from one or more users in the telephony network.

SUMMARY OF THE DISCLOSURE

Dynamic Modification of Communication Operations Exchanged Between Interconnected Networks In one or more embodiments, systems and methods disclosed herein dynamically modify communication operations exchanged between one or more interconnected networks. In particular, the systems and methods may be configured to spoof information associated with the communication operation. The spoofed communication operation may be provided to a testing system and evaluate whether the testing system is capable of determining when a communication operation is spoofed. In some embodiments, to create the spoofed information operation, the systems and methods may be configured to receive the communication operation (e.g., a telephonic call) destined for a recipient in a specific network (e.g., associated with a specific carrier). The systems and methods may be associated with the specific network. In some embodiments, communication operations received from within the specific network may be identified as on-network (e.g., onnet) communications. Further, communication operations received from outside the specific network may be identified as off-network (e.g., offnet) communications. The systems and methods may be configured to determine whether the communication operation is an offnet communication. If the communication operation is determined to be an offnet communication, the systems and methods may be configured to modify at least a portion of a header associated with the communication operation. The header may be modified by decoding the portion of the header, rearranging data associated with the portion of the header, and encoding the rearranged data. In this regard, the header may be reconstructed based at least in part upon the encoded rearranged data. At this stage, the communication operation is forwarded to a testing system in the specific network. The testing system may be configured to determine whether the modified version of the communication operation is spoofed.

In one or more embodiments, the systems and methods described herein are integrated into a practical application of dynamically modifying communication operations exchanged between one or more interconnected network. In particular, the practical application comprises modifying header information associated with communication operations received from an outside network (e.g., not a specific network) to enable testing of spoofed communications. In this regard, the systems and methods provide the practical applications of: (1) generating spoofed communications generated outside of the specific network to be evaluated by a testing system in the specific network; (2) reduce a number of operations required to simulate spoofing for the testing systems; (3) spoof communication operations by modifying corresponding header information; and (4) evaluate dynamic detection capabilities of the testing systems using calls that originate outside of the specific network.

In addition, the systems and methods described herein are integrated into a technical advantage of increasing processing speeds in a computer system, because processors associated with the systems and methods are configured to combine encoding operations and decoding operations to generate a spoofed communication operation in a specific network. The systems and methods may generate a reconstructed header for spoofed communications without comprising inclusion of additional systems and/or networks to generate the spoofed communication operations. In this regard, the systems and methods described herein are integrated into the practical application of reducing and/or eliminating delays caused by third parties configured to process communication operations to generate the spoofed communication operations because the systems and the methods receive communication operations, dynamically modify the communication operations, and generate spoofed versions of the communication operations to be tested by one or more testing systems associated with the specific network.

In one or more embodiments, the system and the method may be performed by an apparatus, such as a server, communicatively coupled to multiple network components in a core network, one or more base stations in a radio access network, and one or more user equipment. Further, the system may be a wireless communication system, that comprises the apparatus. In addition, the system and the method may be performed as part of a process performed by the apparatus communicatively coupled to the network components in the core network. As a non-limiting example, the apparatus may comprise a memory and a processor communicatively coupled to one another. An apparatus comprises a memory and a processor communicatively coupled to one another. The memory may be configured to store one or more configuration commands configured to trigger one or more encoding operations and one or more decoding operations. The processor may be configured to receive a communication request comprising communication information comprising one or more data packets, obtain identity (ID) header information from the one or more data packets, decode at least one portion of the ID header information into decoded ID header information in response to executing the one or more decoding operations, derive a translation value from the decoded ID header information, and modify the translation value into a modified translation value. Further, the processor is configured to encode the modified translation value into an encoded modified translation value in response to executing the one or more encoding operations, reconstruct the ID header information based at least in part upon the encoded modified translation value, and forward the communication request comprising a reconstructed version of the ID header information to a testing system.

Dynamic Modification of Error Mapping Operations During Communication Operations In one or more embodiments, systems and methods disclosed herein dynamically modify error mapping operations performed during communication operations. In particular, the systems and methods may be configured to identify source of auto-initiated communication requests (e.g., robocallers, spam callers, and the like). The methods and systems may be configured to denylist any, some and/or all identified sources of auto-initiated communication requests. The systems and methods may be configured to identify a source of auto-initiated communication requests when communication operations are received at the specific network for non-existent receivers. The non-existent receivers may be destination communication addresses (e.g., telephone numbers) that are not associated to any services in the specific network. For example, the non-existent receivers may be telephone numbers that are associated with the specific network, but are yet to be registered with a service and/or a recipient in the specific network. The systems and networks may be configured to avoid alerting the source of auto-initiated communication requests that the source is identified as generating auto-initiated communication requests. Instead, the systems and methods may be configured to generate a report to the source indicating that the communication operation cannot be performed at this time. In the example of a robocaller trying to perform a telephonic call, the systems and methods may be configured to provide the robocaller with an error 486 message indicating that the line is busy instead of an error 404 message indicating that the receiver was not found in the specific network. To determine whether the communication operations are received from a source of auto-initiated communication requests, the systems and methods may be configured to capture communication information from one or more communications operations received at a specific network. In some embodiments, the systems and methods may obtain sender information and receiver information from the communication information. Upon determining the receiver information, the systems and methods may be configured to determine whether one or more service directories comprise recipients that match the receiver information. If the service directories do not include recipients that match the receiver information, the systems and methods may identify the communication operation as being generated by a source of auto-initiated communication requests.

In one or more embodiments, the systems and methods described herein are integrated into a practical application of dynamically modifying error mapping operations. In particular, the practical application comprises modifying mapping operations based at least in part upon a type of recipient associated with a communication operation. In this regard, the systems and methods provide the practical applications of: (1) dynamically modifying an error mapping operation if a communication operation is directed to anon-existent recipient; (2) dynamically providing reports indicating error logs that the communication operation cannot be performed at this time instead of indicating whether the communication operation is directed to a non-existent recipient; and (3)

preventing duplicated auto-initiated communication requests from increasing traffic received at the specific network.

In addition, the systems and methods described herein are integrated into a technical advantage of increasing processing speeds in a computer system, because processors associated with the systems and methods are configured to determine whether communication operations are received from sources of auto-initiated communication requests. The systems and methods may generate reports comprising error logs indicating that communication operations cannot be performed at a given time. In this regard, the systems and methods described herein are integrated into the practical application of reducing and/or eliminating traffic caused by auto-initiated communication requests. In particular, the auto-initiated communication requests are reduced and/or eliminated because malicious users are less likely to repeat auto-initiated communication requests to non-existent recipients corresponding error logs indicate that the communication cannot be performed at this time.

In one or more embodiments, the system and the method may be performed by an apparatus, such as a server, communicatively coupled to multiple network components in a core network, one or more base stations in a radio access network, and one or more user equipment. Further, the system may be a wireless communication system, that comprises the apparatus. In addition, the system and the method may be performed as part of a process performed by the apparatus communicatively coupled to the network components in the core network. As a non-limiting example, the apparatus may comprise a memory and a processor communicatively coupled to one another. An apparatus comprises a memory and a processor communicatively coupled to one another. The memory may be configured to store one or more configuration commands configured to trigger one or more error mapping operations and a service directory comprising one or more recipients configured to access one or more entitlements in multiple services. The processor may be configured to receive a communication request from a sender comprising sender information and receiver information, obtain multiple recipients from the service directory, determine whether any recipient from the recipients matches the receiver information, and generate an error log indicating that the communication request is directed towards a recipient engaged on an ongoing communication in response to determining that none of the recipients match the receiver information. Further, the processor is configured to transmit a report comprising the error log to the sender.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an example flowchart of a method to dynamically modify communication operations exchanged between interconnected networks in conjunction with the example communication system of FIG. 1; and FIG. 3 illustrates an example flowchart of a method to dynamically modify error mapping operations performed during communication operations in conjunction with the example communication system of FIG. 1.

DETAILED DESCRIPTION

Figure 1:
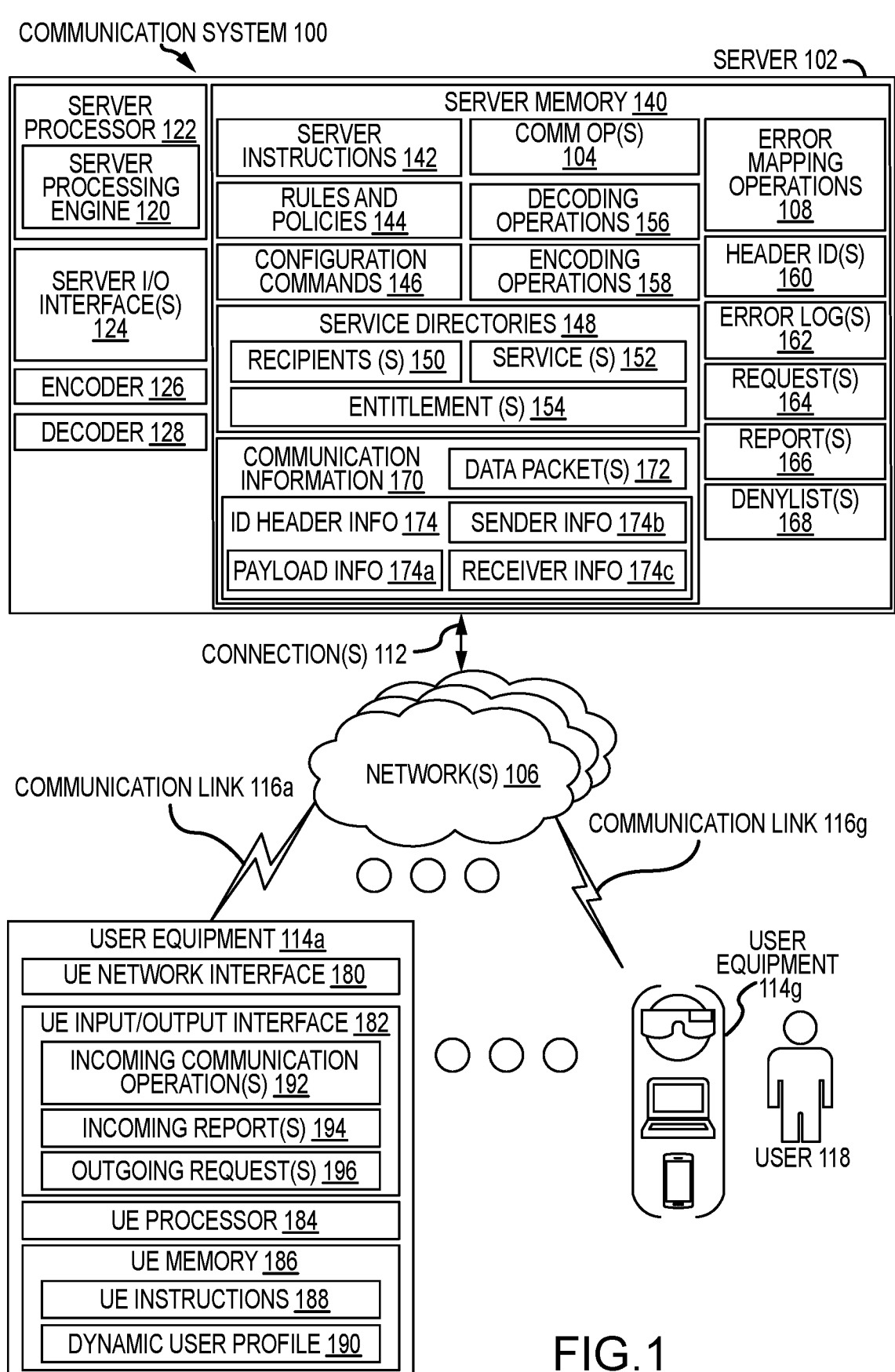
FIG. 1 illustrates an example communication system in accordance with one or more embodiments.

This disclosure provides various systems and methods configured to dynamically modify communication operations exchanged between one or more interconnected networks. Further, this disclosure provides various systems and methods configured to dynamically modify error mapping operations during communication operations. FIG. 1 illustrates a communication system 100 in which a server 102 is configured to dynamically modify one or more communication operations 104 exchanged between one or more interconnected networks 106 and dynamically modify error mapping operations 108 during the one or more communication operations 104. FIG. 2 illustrates a process 200 performed by the communication system 100 of FIG. 1. FIG. 3 illustrates a process 300 performed by the communication system 100 of FIG. 1.

Communication System Overview

FIG. 1 illustrates a diagram of a communication system 100 (e.g., a wired and/or wireless communication system) that comprises a server 102 configured to dynamically modify communication operations 104 exchanged between one or more networks 106, in accordance with one or more embodiments. Further, the server 102 is configured to dynamically modify error mapping operations 108 during the communication operations 104, in accordance with one or more embodiments. In the communication system 100 of FIG. 1, the server 102 may be communicatively coupled to the one or more networks 106 via one or more connections 112. In FIG. 1, the server 102 is communicatively coupled to multiple user equipment 114a-114g (collectively, user equipment 114) via multiple corresponding communication links 116a-116g (collectively, communication links 116) established between each user equipment 114 and the networks 106. As represented by a user equipment 114g, the user equipment 114 may be operated or attended to by one or more users 118. In the example of FIG. 1, the server 102 may be communicatively coupled to multiple additional devices in the communication system 100. While FIG. 1 shows the server 102 connected directly to the one or more networks 106 via the one or more connections 112, the server 102 may be located inside one of the networks 106 as part of one or more of the network components (e.g., not shown).

In one or more embodiments, the communication system 100 comprises the user equipment 114, the one or more networks 106, and the server 102. In come embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., Sub 6 GHz). The communication system 100 may comprise a large number of antennas. In some embodiments, the communication system may perform one or more monitoring operations and/or sensing operations associated with the 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data and communicate with the networks 106 and the user equipment 114. The server 102 may be configured to monitor, track data, control routing of signals, and control operations of certain electronic components in the communication system 100, associated databases, associated systems, and the like, via one or more interfaces. The server 102 is generally configured to oversee operations of the server processing engine 120. The operations of the server processing engine 120 are described further below. In some embodiments, the server 102 comprises a server processor 122, one or more server Input (I)/Output (O) interfaces 124, an encoder 126, a decoder 128, and a server memory 140 communicatively coupled to one another. The server 102 may be configured as shown, or in any other configuration.

The server processor 122 may comprise one or more processors operably coupled to and in signal communication with the one or more server I/O interfaces 124, the encoder 126, the decoder 128, and the server memory 140. The server processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 122 may be a programmable logic device, a microcontroller, a microprocessor, or any suitable combination of the preceding. The one or more processors in the server processor 122 are configured to process data and may be implemented in hardware or software executed by hardware. For example, the server processor 122 may be an 8-bit, a 16-bit, a 32-bit, a 64-bit, or any other suitable architecture. The server processor 122 may comprise an arithmetic logic unit (ALU) to perform arithmetic and logic operations, processor registers that supply operands to the ALU, and store the results of ALU operations, and a control unit that fetches software instructions such as server instructions 142 from the server memory 140 and executes the server instructions 142 by directing the coordinated operations of the ALU, registers and other components via the server processing engine 120. The server processor 122 may be configured to execute various instructions. For example, the server processor 122 may be configured to execute the server instructions 142 to perform functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 124 may be hardware configured to enable one or more operations 202-250 described in reference to FIG. 2 and one or more banner operations 302-352 described in reference to FIG. 3. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may be configured to comprise one or more peripherals such as a network interface, one or more administrator interfaces, and one or more displays. The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components in a core network, the user equipment 114, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces may be part of the server I/O interfaces 124 may be user interfaces configured to provide access and control to of the server 102 to one or more users (e.g., the user 118) or electronic devices. The one or more users may access the server memory 140 upon confirming one or more access credentials (e.g., a user profile) to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 114.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see between the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In some embodiments, the server processor 122 may be configured to perform the data exchange operations and the reporting operations simultaneously, sequentially, or in combination. The server processor 122 may be configured to alternate between the data exchange operations and the reporting operations in real-time. In some embodiments, "real-time" may refer to immediate or near immediate (e.g., within one or two seconds) change of operations. For example, an operation B may be considered to occur in real-time response to an operation A in a case where operation B occurs within a second after operation A. In other embodiments, "real-time" may refer to operations that occur in immediate response to triggering operations even in cases where responding operations occur several minutes after triggering operations.

The encoder 126 may be hardware and/or software executed by hardware configured to encrypt and/or encode data comprising multiple data formats. In some embodiments, the encoder 126 may be configured to convert data from one format into a coded format. The encoder 126 may be configured to perform multiple layers (e.g., levels of encryption) of the encoding operations 158. In this regard, the encoding operations 158 may be executed by the server processor 122 to encode a data element into one or more formats. For example, the encoder 126 may be configured to perform a first encoding operation 158 to encode a first data element from a first format to a second format. Then, the encoder 126 may be configured to perform a second encoding operation 158 to encode the first data element from the second format to a third format.

The decoder 128 may be hardware and/or software executed by hardware configured to decrypt and/or decode data comprising multiple data formats. In some embodiments, the decoder 128 may be configured to convert data from one format into a decoded format. The decoder 128 may be configured to perform multiple layers (e.g., levels of encryption) of the decoding operations 156. In this regard, the decoding operations 156 may be executed by the server processor 122 to decode a data element into one or more formats. For example, the decoder 128 may be configured to perform a first decoding operation 156 to decode a second data element from a first format to a second format. Then, the decoder 128 may be configured to perform a second decoding operation 156 to decode the second data element from the second format to a third format.

The encoder 126 and the decoder 128 may be configured dynamically and/or periodically over time. The encoder 126 and the decoder 128 may be configured over time or preconfigured via the one or more rules and policies 144.

The server memory 140 may be volatile or non-volatile and may comprise a read-only memory (ROM), random-access memory (RAM), ternary content-addressable memory (TCAM), dynamic random-access memory (DRAM), and static random-access memory (SRAM). The server memory 140 may be implemented using one or more disks, tape drives, solid-state drives, and/or the like. The server memory 140 is operable to store the server instructions 142, one or more rules and policies 144, one or more configuration commands 146, one or more service directories 148 comprising one or more recipients 150 of one or more services 152 and one or more entitlements 154 allowed to the recipients 150 by the services 152, the one or more communication operations 104, one or more decoding operations 156, one or more encoding operations 158, the one or more error mapping operations 108, one or more header identifiers (IDs) 160, one or more error logs 162, one or more requests 164, one or more reports 166, one or more denylists 168, communication information 170 comprising one or more data packets 172, and/or ID header information comprising payload information 174a, sender information 174b, and/or receiver information 174c. In the server memory 140, the server instructions 142 may comprise commands and controls for operating one or more specific network functions (NFs) in the one or more networks 106 when executed by the server processing engine 120 of the server processor 122. The server processing engine 120 may be configured to operate as a session border controller configured to perform the one or more decoding operations 156, the one or more encoding operations 158, and/or the error mapping operations 108.

In one or more embodiments, the one or more rules and policies 144 are configured to instruct the server instructions 142 and/or one or more user equipment 114 to establish one or more configuration commands 146 to perform one or more operations in the communication system 100 in a specific order. The one or more rules and policies 144 enable automation of the one or more decoding operations 156, the one or more encoding operations 158, and/or the error mapping operations 108. Further, the rules and policies 144 may indicate one or more changes to the error logs 162. In some embodiments, the one or more rules and policies 144 may be predetermined and/or dynamically assigned by a corresponding user 118 or an organization associated with the server 102.

In one or more embodiments, the configuration commands 146 are configured to coordinate operations of the user equipment 114. Each configuration command of the configuration commands 146 may be configured to provide control information to perform one or more of the operations in the user equipment 114. Further, the configuration commands 146 may be routing and configuration information that control access to services in the user equipment 114. The configuration commands 146 may be routing and configuration information that control access to services in the server 102. The configuration commands 146 may be dynamically and/or periodically updated by the network components in the networks 106 or by the server processor 122.

The service directories 148 may be configured to store service-specific information and/or user-specific information. The service directories 148 may enable the server 102 to confirm user credentials to access one or more network components in the networks 106. The service directories 148 may be configured to store provider-specific information and make the information available to the user equipment 114. The service directories 148 may enable the server 102 to validate credentials associated with a specific provider (e.g., a service or application accessed via the networks 106)

against corresponding user-specific information in the service directories 148 (e.g., a user profile).

In some embodiments, the communication operations 104 may be one, some, and/or all signaling exchanged between the server 102, one or more network components (e.g., nodes and routers among others), the one or more user equipment 114, and/or any other equipment and/or devices associated with the one or more networks 106. The communication operations 104 may be any control commands and/or signaling associated with transmissions and/or receptions of one or more devices in the communication system 100.

In one or more embodiments, the error mapping operations 108 may be one or more operations configured to map, assign, and/or generate entries in error logs 162. The error mapping operations 108 may be configured to provide one or more responses to communication operations 104 received by the server 102. For example, the error mapping operations 108 may generate one or more error messages comprising telephonic signals in response to communication operations 104 comprising telephonic calls.

The header IDs 160 (also referred to as ID headers) may be a portion of specific communication operations 104. The header IDs 160 may be configured to provide a relation between an originating network 106 (e.g., a service provider and/or carrier in which the specific communication operation 104 is generated). The header ID 160 may comprise some or all the ID header information 174. In the example of FIG. 1, the header IDs 160 comprise multiple formats of a same header and/or multiple headers of a same format. For example, the header IDs 160 may comprise a first format of a header associated with a communication operation 104, an encoded version of the header in a second format, and a decoded version of the header in a third format. In some embodiments, the header IDs 160 comprise one or more versions of a header. For example, the header IDs 160 may comprise a first version of a header in a first format received in a communication operation 104 and a second version of the header in a second version after the header is reconstructed via the one or more decoding operations 156.

In one or more operations, the header is a secure telephone identity revisited (STIR)/signature-based handling of asserted information using tokens (SHAKEN) (also referred to as SHAKEN/STIR) header configured to provide information relating to a sender and a receiver of a specific communication operation 104. The STIR/SHAKEN (S/S) header may be a carrier-based caller identifier/identification authentication standard configured to verify that a call is in fact from a number displayed on a caller identifier/identification and/or is not spoofed.

The S/S header may be configured in accordance with a Session Initiation Protocol (SIP) protocol. The data packets 172 may be SIP packets that comprise a JavaScript Object Notation (JSON) web token (JWT) format and one or more additional parameters. The JWT format may comprise a header, a payload, and a signature. The header and payload may comprise data encoded in JSON.

The error logs 162 may be tables, lists, or alphanumeric and/or symbol strings configured to convey value and/or information. The error logs 162 may be indicators of a communication operation status in a specific network 106. The error logs 162 may be configured to convey information that may be references using encryption, look-up tables, and reference numbers. The error logs 162 may be numeric data points that represent one or more specific statuses of the specific communication information. In one example, an error log 162 comprising the numbers 4, 0, and 4 may indicate that a user cannot be found in the specific network 106. In this case, a report 166 comprising the error message 404 may cause the server processor 122 to trigger generation of a signal indicating that the specific communication operation 104 was directed to a non-existent recipient. In the case of the communication operation comprising a telephonic call, the error message 404 may generate a signal indicating that a dialed phone number cannot be found in the service directories 148. In another example, an error log 162 comprising the numbers 4, 8, and 6 may indicate that a communication line associated with a user is busy at this time in the specific network 106. In this case, a report 166 comprising the error message 486 may cause the server processor 122 to trigger generation of a signal indicating that the specific communication operation 104 was directed to a recipient 150 that is busy. In the case of the communication operation comprising a telephonic call, the error message 486 may generate a signal indicating that a dialed phone number is busy.

The one or more requests 164 and the communication information may be received in one or more of the communication operations 104. The requests 164 may be any communication operation received at the server 102 requesting access to one or more resources in the communication system 100. For example, a request 164 may be a telephonic call received at the server 102. Further, the communication information 170 may be any information types received in a communication operation 104. In the example of FIG. 1, the communication information 170 comprises the one or more data packets 172 and the ID header information 174. The one or more data packets 172 may be data packets and/or control block packets comprising routing commands and/or information in the networks 106. The one or more data packets 172 may comprise data in one or more formats. The ID header information 174 may comprise one or more information types. In the example of FIG. 1, the ID header information 174 comprises the payload information 174a which indicates origination information such as at time in which a specific communication operation 104 is received at the communication system 100, the sender information 174b which indicates a sender (e.g., source) of the specific communication operation 104, and the receiver information 174c which indicates an expected receiver (e.g., destiny) of the specific communication operation 104.

In one or more embodiments, the one or more denylists 168 may be configured to store any, some, and/or all the communication information 170 to a database. The database may be configured to assign fraudulent remarks to user equipment 114 associated with auto-initiated communication requests. The denylists 168 may be lists comprising online information related to one or more identified attackers, spam callers, and otherwise blocked callers. The server 102 may reference the denylists 168 to inform the server 102 that a specific communication operation 104 should not be forwarded to any of the recipients 150.

User Equipment

In one or more embodiments, each of the user equipment 114 (e.g., the user equipment 114a and a user equipment 114g representative of the user equipment 114a-114g) may be any computing device configured to communicate with other devices, such as the server 102, other network components in the networks 106, databases, and the like in the communication system 100. The user equipment 114 may be one or more network components associated with one or more recipients 150. Each of the user equipment 114 may be configured to perform specific functions described herein and interact with one or more network components in the networks 106. Examples of user equipment 114 comprise, but are not limited to, a laptop, a computer, a smartphone, a tablet, a smart device, an IoT device, a simulated reality device, an augmented reality device, or any other suitable type of device.

In one or more embodiments, referring to the user equipment 114a as a non-limiting example of the user equipment 114, the user equipment 114a may comprise a user equipment (UE) network interface 180, a UE I/O interface 182, a UE processor 184 configured to execute a UE processing engine (not shown), and a UE memory 186 comprising one or more UE instructions 188 and a dynamic user profile 190. The UE network interface 180 may be any suitable hardware or software (e.g., executed by hardware) to facilitate any suitable type of communication in wireless or wired connections. These connections may comprise, but not be limited to, all or a portion of network connections coupled to additional network components in the networks 106, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 180 may be configured to support any suitable type of communication protocol.

The UE I/O interface 182 may be hardware configured to perform one or more operations in the user equipment 114 upon execution of the server instructions 142 by the server processor 122. Further, the UE I/O interface 182 may be hardware configured to perform one or more operations upon execution of the UE instructions 188 by the UE processor 184. The UE I/O interface 182 may comprise one or more antennas as part of a transceiver, a receiver, or a transmitter for communicating using one or more wireless communication protocols or technologies. In some embodiments, the UE I/O interface 182 may be configured to communicate using, for example, 5G NR or LTE using at least some shared radio components. In other embodiments, the UE I/O interface 182 may be configured to communicate using single or shared RF bands. The RF bands may be coupled to a single antenna, or may be coupled to multiple antennas (e.g., for a MIMO configuration) to perform wireless communications. In some embodiments, the user equipment 114a may comprise capabilities for voice communication, mobile broadband services (e.g., video streaming, navigation, and the like), or other types of applications. In this regard, the UE I/O interface 182 of the user equipment 114a may communicate using machine-to-machine (M2M) communication, such as machine-type communication (MTC), or another type of M2M communication.

In one or more embodiments, the UE I/O interface 182 may comprise one or more incoming communication operations 192, one or more incoming reports 194, and/or one or more outgoing requests 196. The incoming communication operations 192 may be some or all communication operations 104 received at the user equipment 114a. The one or more incoming reports 194 may be one or more of the reports 166 received from the server 102 at the user equipment 114a. The incoming reports 194 may be any data and/or information in the UE I/O interface 182 comprising text data and image data representative of the reports 166 generated by the server 102. The text data and/or the image data may be static or dynamic. The text data may comprise alphanumeric data strings organized in an organized and/or randomize appearance in the UE I/O interface 182. The image data may be representative of the forms presented in the UE I/O interface 182. For example, the image data may comprise information about videos or images shown in the UE I/O interface 182 via services (e.g., user interface (UI) in applications). The one or more outgoing requests 196 may be one or more of the requests 164 received by the server 102.

In some embodiments, the user equipment 114a is communicatively coupled to one or more of the networks 106 via one or more communication links 116. The user equipment 114a may be a device with cellular communication capability such as a mobile phone, a hand-held device, a computer, a laptop, a tablet, a smart watch or other wearable device, or virtually any type of wireless device. In some applications, the user equipment 114 may be referred to as a UE, UE device, or terminal.

The UE processor 184 may comprise one or more processors operably coupled to and in signal communication with the UE network interface 180, the UE I/O interface 182 interface 182, and the UE memory 186. The UE processor 184 is any electronic circuitry, including, but not limited to, state machines, one or more CPU chips, logic units, cores (e.g., a multi-core processor), FPGAs, ASICs, or DSPs. The UE processor 184 may be a programmable logic device, a microcontroller, a microprocessor, or any suitable combination of the preceding. The one or more processors in the UE processor 184 are configured to process data and may be implemented in hardware or software executed by hardware. For example, the UE processor 184 may be an 8-bit, a 16-bit, a 32-bit, a 64-bit, or any other suitable architecture. The UE processor 184 comprises an ALU to perform arithmetic and logic operations, processor registers that supply operands to the ALU, and store the results of ALU operations, and a control unit that fetches software instructions such as the UE instructions 188 from the UE memory 186 and executes the UE instructions 188 by directing the coordinated operations of the ALU, registers, and other components via the UE processing engine (not shown). The UE processor 184 may be configured to execute various instructions. For example, the UE processor 184 may be configured to execute the UE instructions 188 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In some embodiments, the dynamic user profile 190 is configured to be a centralized hub for all user profiles associated with the user 118. The dynamic user profile 190 may be configured to actively store credentials and preferences from any services associated with the user equipment 114a. In other embodiments, the dynamic user profile 190 evaluates the service directories 148 and associates the preferences of the user 118 in existing entitlements 154 to actively provide the user equipment 114a with a centralized reference profile that is updated specifically for the user 118. The dynamic user profile 190 may cross-associate user preferences among services (i.e., applications or subscriptions) and any entities frequented by the user 118 (e.g., retail organizations, airlines, restaurants, and the like). In some embodiments, the dynamic user profile 190 may provide access to a data exchange mechanism that the user equipment 114a may leverage to exchange data in endpoint terminals in physical environments and virtual environments. In this regard, the dynamic user profile 190 may provide a universal virtual wallet in the user equipment 114a.

Networks

The networks 106 may be a network configured to manage communication sessions for the user equipment 114. In one or more embodiments, the networks 106 may establish connections between user equipment 114 and the server 102 in accordance with one or more communication protocols. The networks 106 may be one or more interconnected networks 106 associated with one or more organizations. In this regard, the networks 106 may be configured to access resources associated to specific services 152 in accordance with corresponding service directories 148. The networks 106 may comprise one or more network components (not shown) configured to perform one or more NFs. In some embodiments, the networks 106 may comprise a core network that enables the user equipment 114 to communicate with the server 102, or another type of device. The networks 106 may implement a communication method that does not require the establishment of a specific communication protocol connection between the user equipment 114 and one or more of the networks 106. The networks 106 may include one or more types of network devices (not shown), which may perform different NFs.

In some embodiments, the networks 106 may comprise a 5G NR or an LTE access network (e.g., an evolved packet core (EPC) network) among others. In this regards, the networks 106 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QOS) class, type of service, or particular user associated with one or more of the user equipment 114. For example, a logical network may be a Mobile Private Network (MPN) configured for a particular organization. In this example, the user equipment 114a may be configured to connect to one or more particular network slices (i.e., logical networks) in the networks 106.

In the example system 100 of FIG. 1, the networks 106 may facilitate communication within the communication system 100. This disclosure contemplates that the networks 106 may be any suitable network operable to facilitate communication between the server 102 and the user equipment 114. The networks 106 may include any interconnecting system capable of transmitting audio, video, signals, data, messages, or any combination of the preceding. The networks 106 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Example Process to Dynamically Modify Communication Operations Exchanged Between Interconnected Networks FIG. 2 illustrate respective example flowchart of the process 200, in accordance with one or more embodiments.

Modifications, additions, or omissions may be made to the process 200. The process 200 may include more, fewer, or other operations than those shown in FIG. 2. For example, operations may be performed in parallel or in any suitable order. While at times discussed as the server 102, one or more of the user equipment 114, components of any of thereof, or any suitable system or components of the security system 100 may perform one or more operations of the process 200. For example, one or more operations of the process 200 may be implemented, at least in part, in the form of server instructions 142 of FIG. 1, stored on non-transitory, tangible, machine-readable media (e.g., server memory 140 of FIG. 1 operating as a non-transitory computer readable medium) that when run by one or more processors (e.g., the server processor 122 of FIG. 1) may cause the one or more processors to perform operations described in operations 202-250.

In one or more embodiments, the process 200 implements negative S/S test operations at the server 102. In this regard, the server 102 may be configured to dynamically modify communication operations 104 exchanged between two or more networks 106. The process 200 is configured to modify the communication operations 104 to be evaluated by one or more testing systems associated with a specific network 106. In some embodiments, the process 200 comprises modifying the ID header information 174 of a given communication operation 104 to generate a spoofed version of the given communication operation 104. The spoofed version of the given communication operation 104 may be provided to the one or more testing systems. In this regard, the process 200 may be configured to simulate spoofed calls in the specific network without informing the testing systems ahead of time. The testing systems may be configured to evaluate whether the spoofed version of the given communication operation 104 is spoofed.

In some embodiments, the testing systems are configured to evaluate a format of ID header information 174 associated with the given communication operation 104. Herein, the testing systems may be configured to determine that the given communication operation 104 is spoofed if the ID header information 174 comprises an unexpected format. As described above, the unexpected format may be a modification to an original format of the ID header information 174 when the given communication operation 104 was received at the server 102.

FIG. 2 illustrates an example flowchart of the process 200 to dynamically modify communication operations 104 exchanged between interconnected networks 106, in accordance with one or more embodiments. In one or more embodiments, the process 200 starts at operation 202, where the server 102 is configured to receive one or more communication operations 104. In this regard, the server 102 may be configured to determine whether a specific communication operation 104 is received in a specific network 106 (e.g., a specific carrier). At operation 204, the server 102 is configured to capture communication information 170 from the specific communication operations 104. Herein, the server 102 may be configured to receive a communication request 164 comprising communication information 170 comprising one or more data packets 172. As described above, the one or more data packets 172 may be configured as SIP packets. At operation 206, the server 102 is configured to obtain ID header information 174 from the communication information 170 in the data packets 172. The server 102 may be configured to obtain ID header information 174 from the one or more data packets 172. The ID header information 174 is configured in accordance with one or more call routing standards and guidelines, such as a S/S header.

The process 200 continues at operation 210, where the server 102 may determine whether the specific communication operation 104 is an offnet communication. As described above, examples of offnet communications are communication operations 104 received from one or more networks 106 that are not directly associated with the one or more services 152. If the server 102 determines that the communication operation 104 is an offnet communication (i.e., YES), the process 300 returns to operation 212. If the server 102 determines that the communication operation 104 is not an offnet communication (i.e., NO), the process 300 proceeds to operation 242.

At operation 212, the server 102 is configured to copy a payload portion of the payload information 174a from the ID header information 174 to a decoder 128. At operation 214, the server 102 is configured to decode the payload portion as part of the one or more decoding operations 156. In conjunction with obtaining the ID header information 174 from the one or more data packets 172, the server 102 is configured to decode the at least one portion of the ID header information 174 in accordance with the decoder 128. The decoder 128 may comprise a web token authenticator configured to decode data in the JWT format. The decoder 128 may be configured to decode a payload portion (e.g., the payload information 174a) of the decoded ID header information 174 into decoded payload portion in accordance with a timestamp conversion tool. Herein, the server 102 may be configured to identify the decoded payload portion as a translation value. The decoder 128 may be configured to derive the translation value from the decoded ID header information. At operation 220, the server 102 is configured to translate the decoded payload portion in accordance with the one or more decoding operations 156. At operation 222, as part of translating the payload portion, the server 102 is configured to generate a translation value based at least in part upon the payload portion. At operation 224, as part of translating the payload portion, the server 102 is configured to generate translation information based at least in part upon the translation value. At operation 226, the server 102 is configured to modify the translation information. In some embodiments, the server 102 is configured modify the translation value into a modified translation value. The modified translation value may be representative of a timestamp associated with a start of the communication request 164. At operation 228, the server 102 is configured to encode the modified translation information in accordance with the one or more encoding operations 158. In response to executing the one or more encoding operations 158, the encoder 126 may be configured to encode the modified translation value into an encoded modified translation value. Further, the server 102 may be configured encode the modified translation value into the encoded modified translation value in accordance with a timestamp conversion tool and a web token authenticator (e.g., JWT authenticator). At operation 230, the server 102 is configured to generate a modified payload portion based at least in part upon the modified translation portion. At operation 232, the server 102 is configured to reconstruct the ID header based at least in part upon the modified payload portion. Herein, the server 102 may be configured to reconstruct the ID header information 174 based at least in part upon the encoded modified translation value. The modified translation value may be representative of a timestamp associated with a start of the communication request 164.

At operation 242, the server 102 is configured to determine that the communication operation is an in-network communication. As described above, examples of onnet communications are communication operations 104 received from one or more networks 106 that are directly associated with the one or more services 152. At operation 244, the server 102 is configured to modify the payload portion in the ID header of the communication operation 104.

The process 200 may conclude at operation 250, where the server 102 is configured to forward the communication operation 104 with the modified payload portion to a testing system.

Example Process to Dynamically Modify Error Mapping Operations During Communication Operations FIG. 3 illustrate respective example flowchart of the process 300, in accordance with one or more embodiments. Modifications, additions, or omissions may be made to the process 300. The process 300 may include more, fewer, or other operations than those shown in FIG. 3. For example, operations may be performed in parallel or in any suitable order. While at times discussed as the server 102, one or more of the user equipment 114, components of any of thereof, or any suitable system or components of the security system 100 may perform one or more operations of the process 300. For example, one or more operations of the process 300 may be implemented, at least in part, in the form of server instructions 142 of FIG. 1, stored on non-transitory, tangible, machine-readable media (e.g., server memory 140 of FIG. 1 operating as a non-transitory computer readable medium) that when run by one or more processors (e.g., the server processor 122 of FIG. 1) may cause the one or more processors to perform operations described in operations 302-352.

In one or more embodiments, the process 300 modifies error logs 162 in reports 166 send to a sender. In this regard, the server 102 may be configured to deter sources of auto-initiated communication requests from outside of a specific network 106. The process 200 is configured to modify the error logs 162 by replacing first error messages indicating that a user 118 cannot be found (e.g., 404 error messages) with second error messages indicating that the user 118 is busy on an ongoing communication operation 104 (e.g., 486 error messages). In some embodiments, the communication operation 104 is a telephonic call. In this regard, the first error messages may be indicative that the user 118 cannot be found in the specific network 106. Further, the second error messages may be indicative that the telephonic call cannot be completed as dialed. As described above, the second error messages may comprise audio and/or visual signals indicating that a communication line is busy (e.g., busy signal or user busy signal).

FIG. 3 illustrates an example flowchart of the process 300 to dynamically modify error mapping operations 108 during communication operations 104, in accordance with one or more embodiments. In one or more embodiments, the process 300 starts at operation 302, where the server 102 is configured to receive one or more communication operations 104. Herein, the server 102 is configured to receive a communication request 164 from a sender (e.g., a user equipment 114) comprising sender information 174b and receiver information 174c. At operation 304, the server 102 is configured to capture communication information 170 from a specific communication operation 104 comprising the communication request 164. The communication request 164 may be generated by an off-network telephone call. At operation 306, the server 102 is configured to obtain a sender from the sender information 174b and a receiver information 174c from the communication information 170. At operation 308, the server 102 is configured to obtain at least one recipient 165 from the one or more directories 148.

The process 300 continues at operation 320, where the server 102 is configured to determine whether the recipients 150 from the one or more service directories 148 comprise the receiver obtained from the receiver information 174c. If the server 102 determines that the recipients 150 from the one or more service directories 148 do not comprise the receiver obtained from the receiver information 174c (i.e., NO), the process 300 proceeds to operation 322. At operation 322, the server 102 is configured to generate a report 105 indicating that the communication operation 104 cannot be completed at this time. In response to determining that none of the recipients 150 match the receiver information 174c, the server 102 may be configured to generate an error log 162 indicating that the communication request 164 is directed towards a recipient 150 engaged on an ongoing communication operation 104. Herein, the server 102 may be configured to generate an error report 166 comprising the error log 162. For example, the error log 162 may comprise a 486 error code. If the server 102 determines that the recipients 150 from the one or more service directories 148 comprise the receiver obtained from the receiver information 174c (i.e., YES), the process 300 proceeds to operation 332. In this case, the process 300 may conclude at operation 332, where the server 102 is configured to forward the communication operation 104 to the recipient 150.

The process 300 continues at operation 340 upon generating the report 166 indicating that the communication operation 104 cannot be completed at this time at operation 322. At operation 340, the server 102 is configured to determine whether the sender is associated with a repeat communication. If the server 102 determines that the sender is associated with a repeat communication (i.e., YES), the process 300 proceeds to operation 342. In response to transmitting the report 166 comprising the error log 162 to the sender, the server 102 may be configured to determine that the sender is associated with a source of auto-initiated communication requests (e.g., robocalls). At operation 342, the server 102 is configured to provide information associated with the sender to a denylist 168. In conjunction with determining that the sender is associated with a source of auto-initiated communication requests, the server 102 may be configured to add the sender information 174b to the denylist 168 for a period of time. Herein, the period of time may be a time duration established dynamically and/or periodically by the rules and policies 144 and/or the configuration commands 146. If the server 102 determines that the sender is not associated with a repeat communication (i.e., NO), the process 300 proceeds to operation 352. At operation 352, where the server 102 is configured to associate the sender to a repeat communication. In this case, the process 300 may conclude at operation 332, operation 342, or operation 352.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
a memory, comprising:
    one or more configuration commands configured to trigger one or more encoding operations and one or more decoding operations; and
a processor communicatively coupled to the memory and configured to:
    receive a communication request comprising communication information comprising one or more data packets;
    obtain identity (ID) header information from the one or more data packets;
    in response to executing the one or more decoding operations, decode at least one portion of the ID header information into decoded ID header information;
    derive a translation value from the decoded ID header information;
    modify the translation value into a modified translation value;
    in response to executing the one or more encoding operations, encode the modified translation value into an encoded modified translation value;
    reconstruct the ID header information based at least in part upon the encoded modified translation value; and
    forward the communication request comprising a reconstructed version of the ID header information to a testing system.

2. The apparatus of claim 1, wherein the processor is further configured to:
in conjunction with obtaining the ID header information from the one or more data packets, decode the at least one portion of the ID header information into the decoded ID header information in accordance with a web token authenticator;
decode a payload portion of the decoded ID header information into decoded payload portion in accordance with a timestamp conversion tool; and
identify the translation value in the decoded payload portion.

3. The apparatus of claim 1, wherein the processor is further configured to:
in conjunction with encoding the modified translation value into the encoded modified translation value, encode the modified translation value into the encoded modified translation value in accordance with a timestamp conversion tool and a web token authenticator.

4. The apparatus of claim 1, wherein the one or more data packets are session initiation protocol (SIP) packets.

5. The apparatus of claim 1, wherein the ID header information is configured in accordance with one or more call routing standards and guidelines.

6. The apparatus of claim 1, wherein the modified translation value is representative of a timestamp associated with a start of the communication request.

7. The apparatus of claim 1, wherein the testing system is configured to determine whether the communication request is spoofed.

8. A method, comprising:
receiving a communication request comprising communication information comprising one or more data packets;
obtaining identity (ID) header information from the one or more data packets;
in response to executing one or more decoding operations, decoding at least one portion of the ID header information into decoded ID header information;
deriving a translation value from the decoded ID header information;
modifying the translation value into a modified translation value;
in response to executing one or more encoding operations, encoding the modified translation value into an encoded modified translation value;
reconstructing the ID header information based at least in part upon the encoded modified translation value; and
forwarding the communication request comprising a reconstructed version of the ID header information to a testing system.

9. The method of claim 8, further comprising:
in conjunction with obtaining the ID header information from the one or more data packets, decoding the at least one portion of the ID header information into the decoded ID header information in accordance with a web token authenticator;
decoding a payload portion of the decoded ID header information into decoded payload portion in accordance with a timestamp conversion tool; and
identifying the translation value in the decoded payload portion.

10. The method of claim 8, further comprising:
in conjunction with encoding the modified translation value into the encoded modified translation value, encoding the modified translation value into the encoded modified translation value in accordance with a timestamp conversion tool and a web token authenticator.

11. The method of claim 8, wherein the one or more data packets are session initiation protocol (SIP) packets.

12. The method of claim 8, wherein the ID header information is configured in accordance with one or more call routing standards and guidelines.

13. The method of claim 8, wherein the modified translation value is representative of a timestamp associated with a start of the communication request.

14. The method of claim 8, wherein the testing system is configured to determine whether the communication request is spoofed.

15. A non-transitory computer readable medium storing instructions that when executed by a processor cause the processor to:

receive a communication request comprising communication information comprising one or more data packets;

obtain identity (ID) header information from the one or more data packets;

in response to executing one or more decoding operations, decode at least one portion of the ID header information into decoded ID header information;

derive a translation value from the decoded ID header information;

modify the translation value into a modified translation value;

in response to executing one or more encoding operations, encode the modified translation value into an encoded modified translation value;

reconstruct the ID header information based at least in part upon the encoded modified translation value; and forward the communication request comprising a reconstructed version of the ID header information to a testing system.

16. The non-transitory computer readable medium of claim 15, wherein the instructions further cause the processor to:

in conjunction with obtaining the ID header information from the one or more data packets, decode the at least one portion of the ID header information into the decoded ID header 20 information in accordance with a web token authenticator;

decode a payload portion of the decoded ID header information into decoded payload portion in accordance with a timestamp conversion tool; and identify the translation value in the decoded payload portion.

17. The non-transitory computer readable medium of claim 15, wherein the instructions further cause the processor to:

in conjunction with encoding the modified translation value into the encoded modified translation value, encode the modified translation value into the encoded modified translation value in accordance with a timestamp conversion tool and a web token authenticator.

18. The non-transitory computer readable medium of claim 15, wherein the one or more data packets are session initiation protocol (SIP) packets.

19. The non-transitory computer readable medium of claim 15, wherein the ID header information is configured in accordance with one or more call routing standards and guidelines.

20. The non-transitory computer readable medium of claim 15, wherein the modified translation value is representative of a timestamp associated with a start of the communication request.

* * * * *